US012743499B1

(12) United States Patent
Kats et al.

(10) Patent No.: US 12,743,499 B1
(45) Date of Patent: Sep. 22, 2026

(54) SYSTEMS AND METHODS FOR PASSWORD RECOVERY WITHIN AN UNTRUSTED ENVIRONMENT

(71) Applicant: GEN DIGITAL INC., Tempe, AZ (US)

(72) Inventors: Daniel Kats, Los Angeles, CA (US); Beyza Bozdemir, Paris (FR)

(73) Assignee: Gen Digital Inc., Tempe, AZ (US)

( * ) Notice: Subject to any disclaimer, the term of this patent is extended or adjusted under 35 U.S.C. 154(b) by 345 days.

(21) Appl. No.: 18/341,430

(22) Filed: Jun. 26, 2023

(51) Int. Cl.
*G06F 21/45* (2013.01)
*H04L 9/08* (2006.01)

(52) U.S. Cl.
CPC .............. *G06F 21/45* (2013.01); *H04L 9/085* (2013.01); *H04L 9/0894* (2013.01); *G06F 2221/2103* (2013.01); *G06F 2221/2131* (2013.01)

(58) Field of Classification Search
CPC ........ G06F 21/45; H04L 9/085; H04L 9/0894
USPC ........................................................... 726/26
See application file for complete search history.

(56) References Cited

U.S. PATENT DOCUMENTS

2021/0111876 A1* 4/2021 Gallancy ............... H04L 67/142
2022/0014354 A1* 1/2022 Valladolid ............. H04L 9/3271
2023/0155835 A1* 5/2023 Edge ..................... H04L 9/3226 713/168
2023/0325815 A1* 10/2023 Parker ................ G06Q 20/3821 705/67

OTHER PUBLICATIONS

Agrawal, et al., PASTA: PASsword-based Threshold Authentication, Association for Computing Machinery, CCS '18: Proceedings of the 2018 ACM SIGSAC Conference on Computer and Communications Security; Oct. 15, 2018.

* cited by examiner

*Primary Examiner* — Chau Le
*Assistant Examiner* — Phuc Pham
(74) *Attorney, Agent, or Firm* — ALG Intellectual Property, LLC

(57) ABSTRACT

A computer-implemented method for password recovery within an untrusted environment may include (i) deconstructing an encryption key associated with accessing a password for a target user into key components, (ii) distributing the key components to a random subset of users associated with a password manager service, (iii) authenticating recovery signal data associated with a request to recover the target user password, (iv) publishing password recovery data to a recovery signal ledger in response to the request to recover the target user password, and (v) performing a security action that utilizes the password recovery data in the recovery signal ledger to send the key components from the random subset of users to the target user for reconstructing the encryption key. Various other methods, systems, and computer-readable media are also disclosed.

20 Claims, 7 Drawing Sheets

...

...

Recovery Server
502B
Recovery Answer Portion (2 of 10)
504B
Group Message
506

Recovery Server
502A
Recovery Answer Portion (1 of 10)
504A
Group Message
506

SYSTEMS AND METHODS FOR PASSWORD RECOVERY WITHIN AN UNTRUSTED ENVIRONMENT

BACKGROUND

Password manager services (i.e., password managers) may often be utilized as security best practices by organizations and individual users for storing passwords to facilitate using different secure passwords for accessing websites, applications, etc. on computing devices. As a part of these security best practices, the password managers utilized for storing the aforementioned passwords, also need to be secured by a strong password (e.g., a master password).

Traditional password managers, however, suffer from a number of drawbacks in instances where users need to recover their master password. For example, since the master password utilized for storing user passwords may not itself be stored in a password manager, users must either remember the master password or physically store a code (e.g., a printed text or QR code which may potentially be misplaced over time) for recovering an encryption key of the password manager. Additionally, the storage of the encryption key itself is often limited to a single trusted user device with specific hardware capabilities and thus may be unusable if the user changes devices or the user's device hardware is incapable of supporting this feature. Moreover, while some password managers may often allow users to designate trusted third parties for maintaining their encryption keys for later recovery, this approach is only effective if the user is associated with a trusted third party (e.g., another family or corporate user sharing the same password manager account).

SUMMARY

As will be described in greater detail below, the present disclosure describes various systems and methods for password recovery within an untrusted environment.

In one example, a method for protecting the security of authentication credentials utilized to access sensitive data during online transactions may include (i) deconstructing, by one or more computing devices, an encryption key associated with accessing a password for a target user into a group of key components, (ii) distributing, by the one or more computing devices, the key components to a random subset of users associated with a password manager service, (iii) authenticating, by the one or more computing devices, recovery signal data associated with a request to recover the target user password, (iv) publishing, by the one or more computing devices and in response to the authenticating, password recovery data to a recovery signal ledger in response to the request to recover the target user password, and (v) performing, by the one or more computing devices, a security action that utilizes the password recovery data in the recovery signal ledger to send the key components from the random subset of users to the target user for reconstructing the encryption key.

In some examples, the encryption key for the target user password may be deconstructed into the key components by splitting the encryption key into multiple portions within a numerical range derived from a secret sharing scheme. In some examples, the key components may be distributed to the random subset of users associated with the password manager service by (i) encrypting the key components utilizing a public key associated with each of the random subset of users, (ii) saving the encrypted key components in the password manager service, and (iii) storing each of the encrypted key components in a password vault associated with each of the random subset of users. In some examples, each of the encrypted key components may be stored by utilizing a encryption key associated with each of the random subset of users and a user identification associated with the target user to protect each of the encrypted key components in the password vault. Additionally or alternatively, each of the key components may be stored by (i) generating a set of distinct identifiers for the each of the random subset of users and (ii) assigning each of the distinct identifiers to each of the encrypted key components in the password vault.

In some examples, the recovery signal data may be authenticated by (i) receiving one or more answers to a set of security recovery questions associated with a password manager account for the target user password; (ii) distributing a portion of each of the answers to each of a group of recovery servers; and (iii) authenticating the answers as the recovery signal data. In some examples, the portion of each of the answers to each of the group of the recovery servers may be distributed by (i) generating a hash of the portion of each of the answers and (ii) distributing the hash to each of the group of recovery servers.

In some examples, the security action may be performed by (i) determining whether a threshold number of the random subset of users have decrypted the key components and (ii) sending the key components associated with the threshold number of the random subset of users to the target user for reconstructing the encryption key associated with accessing the target user password. In some examples, the key components may be redistributed to a new random subset of users associated with the password manager service upon detecting network inactivity (e.g., users offline or account terminations) among the random subset of users associated with the password service.

In one embodiment, a system for cloud-based password recovery within an untrusted user environment may include at least one physical processor and physical memory that includes computer-executable instructions that, when executed by the physical processor and a set of modules, cause the physical processor to (i) deconstruct, by a key module, an encryption key associated with accessing a password for a target user into a group of key components, (ii) distribute, by a distribution module, the key components to a random subset of users associated with a password manager service, (iii) authenticate, by an authentication module, recovery signal data associated with a request to recover the target user password, (iv) publish, by a recovery module and in response to the authenticating, password recovery data to a recovery signal ledger in response to the request to recover the target user password, and (v) perform, by a security module, a security action that utilizes the password recovery data in the recovery signal ledger to send the key components from the random subset of users to the target user for reconstructing the encryption key.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) deconstruct an encryption key associated with accessing a password for a target user into a group of key components, (ii) distribute the key components to a random subset of users associated with a password manager service, (iii) authenticate recovery signal data associated with a request to recover the target user password, (iv) publish, in response to the authenticating, password recovery data to a recovery signal ledger in response to the request to recover the target user password, and (v) perform a security action that utilizes the password recovery data in the recovery signal ledger to send the key components from the random subset of users to the target user for reconstructing the encryption key.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
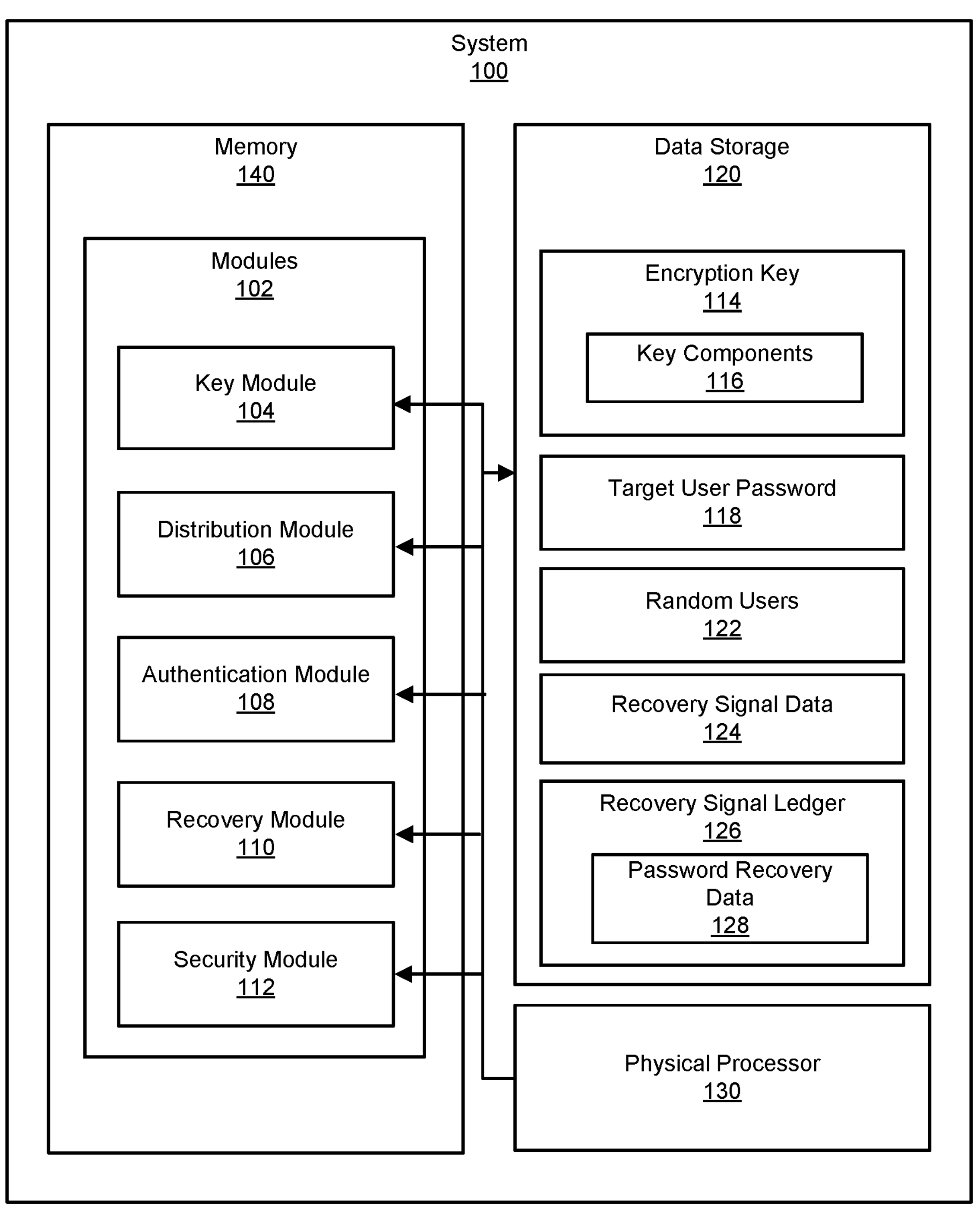
FIG. 1 is a block diagram of an example system for password recovery within an untrusted environment.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for password recovery within an untrusted environment. As will be described in greater detail below, by utilizing sharing scheme (e.g., k of N sharing) in a password manager service to split a target user's password encryption key (derived from the user's master password) into multiple encrypted components or chunks among a set of other users (who may be a random subset of password manager service users who are unrelated/untrusted with respect to the target), the systems and methods described herein may protect the target user's master password from being compromised by outside adversaries and provide secure retrieval during lost/forgotten password recovery operations. During the password recovery operations, the password manager service may utilize a group of recovery servers, each of which may be utilized for authenticating a portion of target user's recovery request (e.g., by utilizing portions of recovery answers to security recovery questions) to a recovery signal ledger as a group-signed message. Clients for the other users may periodically monitor the ledger for the message and locally decrypt their respective key chunks for sending them as encrypted data (e.g., using the target user's public key) to the password manager service for reconstruction of the target user's encryption key.

The systems and methods described herein may improve the field of password manager security by protecting user passwords against being compromised by adversaries by dividing password encryption keys into encrypted portions among multiple random users of a password manager service, thereby preventing outside key decryption (as the adversaries would not have access to any user private keys) or key reconstruction (since each chunk is encrypted). Additionally, the systems and methods described herein may further improve the field of password manager security by using multiple recovery servers for authenticating and servicing password recovery requests, thereby making it unlikely for an adversary to compromise all of the recovery servers in the group.

Figure 2:
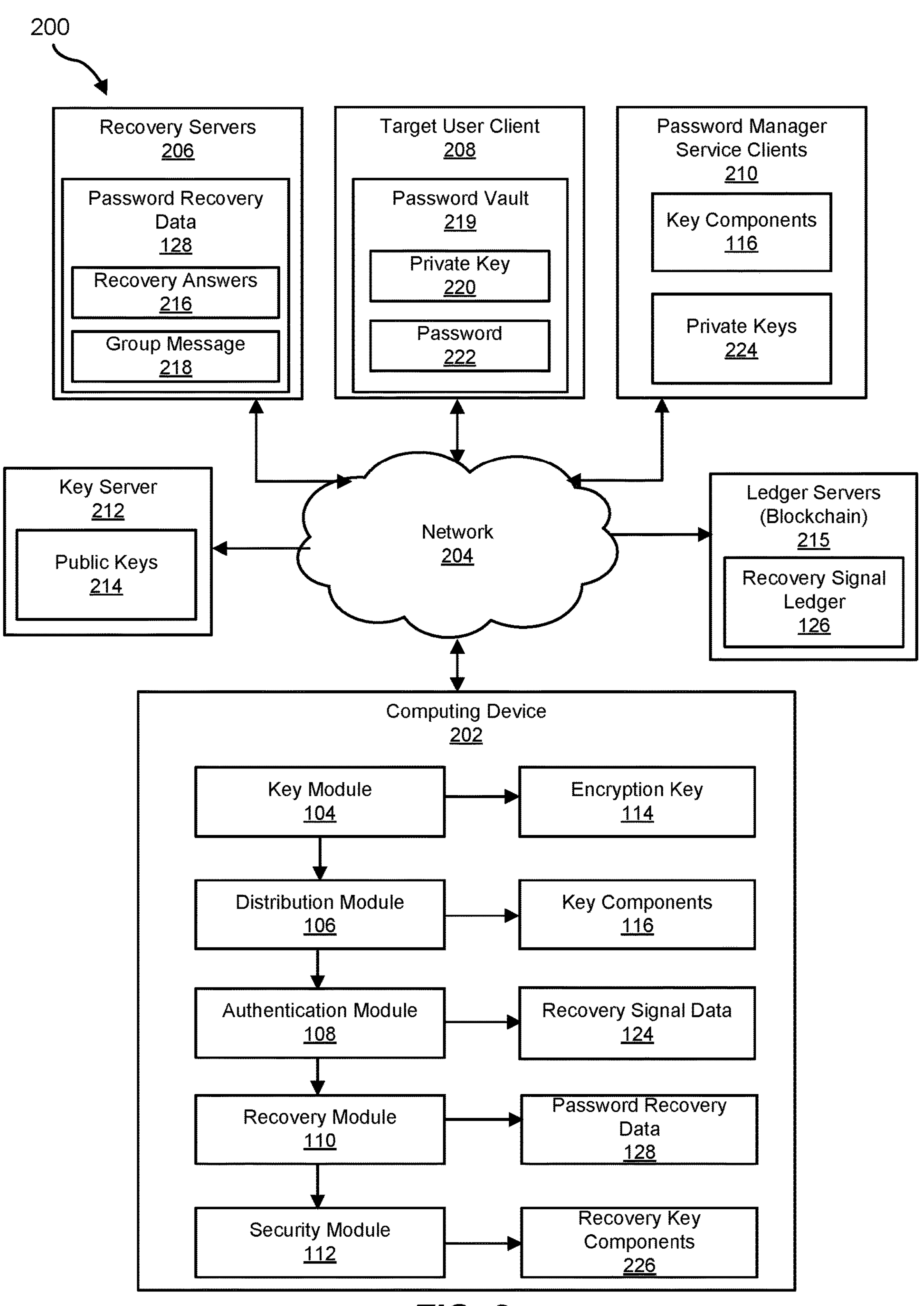
FIG. 2 is a block diagram of an additional example system for password recovery within an untrusted environment.

The following will provide, with reference to FIGS. 1-2, detailed descriptions of example systems for password recovery within an untrusted environment. Detailed descriptions of corresponding computer-implemented methods will also be provided in connection with FIG. 3. Detailed descriptions of example password manager service clients and example recovery servers that may be utilized in the example system of FIG. 2, will also be provided in connection with FIGS. 4 and 5, respectively. In addition, detailed descriptions of an example computing system and network architecture capable of implementing one or more of the embodiments described herein will be provided in connection with FIGS. 6 and 7, respectively.

FIG. 1 is a block diagram of an example system 100 for password recovery within an untrusted environment. As illustrated in this figure, example system 100 may include one or more modules 102 for performing one or more tasks. For example, and as will be explained in greater detail below, example system 100 may include a key module 104 that deconstructs an encryption key 114 associated with accessing a password for a target user (i.e., target user password 118) into key components 116. Example system 100 may also include a distribution module 106 that distributes key components 116 to a random subset of users (i.e., random users 122) associated with a password manager service. Example system 100 may additionally include an authentication module 108 that authenticates recovery signal data 124 associated with a request to recover target user password 118. Example system 100 may also include a recovery module 110 that publishes password recovery data 128 to a recovery signal ledger 126 in response to the request to recover target user password 118. Example system 100 may additionally include a security module 112 that performs a security action that utilizes password recovery data to send key components 116 to the target user for reconstructing encryption key 114. Although illustrated as separate elements, one or more of modules 102 in FIG. 1 may represent portions of a single module or application.

The term "random users" (which may also be referred to as a subset of random users) as used herein, may generally refer to a group of randomly selected users of a password manager service who are unrelated/untrusted with respect to a target user of the same service who may request recovery of an encryption key. In some examples, the subset of random users may each have individual accounts on the password manager service which are not shared with the target user.

The term "recovery signal ledger" as used herein, may generally refer to a distributed ledger for maintaining message data representing a consensus determination of an authenticated recovery request (e.g., via answers to security recovery questions) by a group of recovery servers. In some examples, the recovery signal ledger may be implemented as a permissive or private blockchain comprising one or more ledger servers. In some examples, the recovery signal ledger may be utilized in a password manager service network environment including recovery servers, trusted key servers (for storing public keys associated with password manager service users), and client devices associated with the password manager service users.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or recovery servers 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate password recovery within an untrusted environment. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with recovery servers 206 (which may store password recovery data 128, recovery answers 216, and group message 218), target user client 208 (which may store private key 220 and password 222), password manager service clients 210 (which may store key components 116 and private keys 224), key server 212 (which may store public keys 214), and ledger servers 215 (which may store recovery signal ledger 126), via a network 204. In one example, all or a portion of the functionality of modules 102 may be performed by computing device 202, recovery servers 206, and/or any other suitable computing system. As will be described in greater detail below, one or more of modules 102 from FIG. 1 may, when executed by at least one processor of computing device 202 and/or recovery servers 206, enable computing device 202 and/or recovery servers 206 to perform cloud-based password recovery within an untrusted user environment. For example, and as will be described in greater detail below, key module 104, distribution module 106, authentication module 108, recovery module 110, and security module 112, may cause computing device 202 and/or recovery servers 206 to distribute password recovery data 128 for target user client 208 among untrusted users (i.e., password manager service clients 210) to generate recovery key components 226 for target user client 208, without compromising the security of a password manager service.

Computing device 202 generally represents any type or form of computing device capable of executing and/or reading computer-executable instructions. In some examples, computing device 202 may be a security server configured to provide password manager services to client computing devices. Although illustrated as a single entity in FIG. 2, computing device 202 may include and/or represent a plurality of servers that work and/or operate in conjunction with one another.

Recovery servers 206 generally represent any type or form of computing device that is capable of executing and/or reading computer-executable instructions. In some examples, recovery servers 206 may be security servers configured to facilitate the recovery of user passwords by a password manager service.

Key server 212 generally represents any type or form of computing device capable of executing and/or reading computer-executable instructions. In some examples, key server 212 may be a security server configured to store public keys associated with users of a password manager service. Although illustrated as a single entity in FIG. 2, key server 212 may include and/or represent a plurality of servers that work and/or operate in conjunction with one another.

Ledger servers 215 generally represent any type or form of computing device that is capable of executing and/or reading computer-executable instructions. In some examples, ledger servers 215 may be security servers (e.g., permissive blockchain servers) configured to store message data utilized for the recovery of user passwords by a password manager service.

Target user client 208 and password manager service clients 210 generally represent any type or form of computing device that is capable of executing and/or reading computer-executable instructions. In some examples, target user client 208 and password manager service clients 210 may be computing devices running client-side password manager security software. Additional examples of target user client 208 and password manger service clients 210 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202, recovery servers 206, target user client 208, password manager service clients 210, key server 212, and ledger servers 215. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
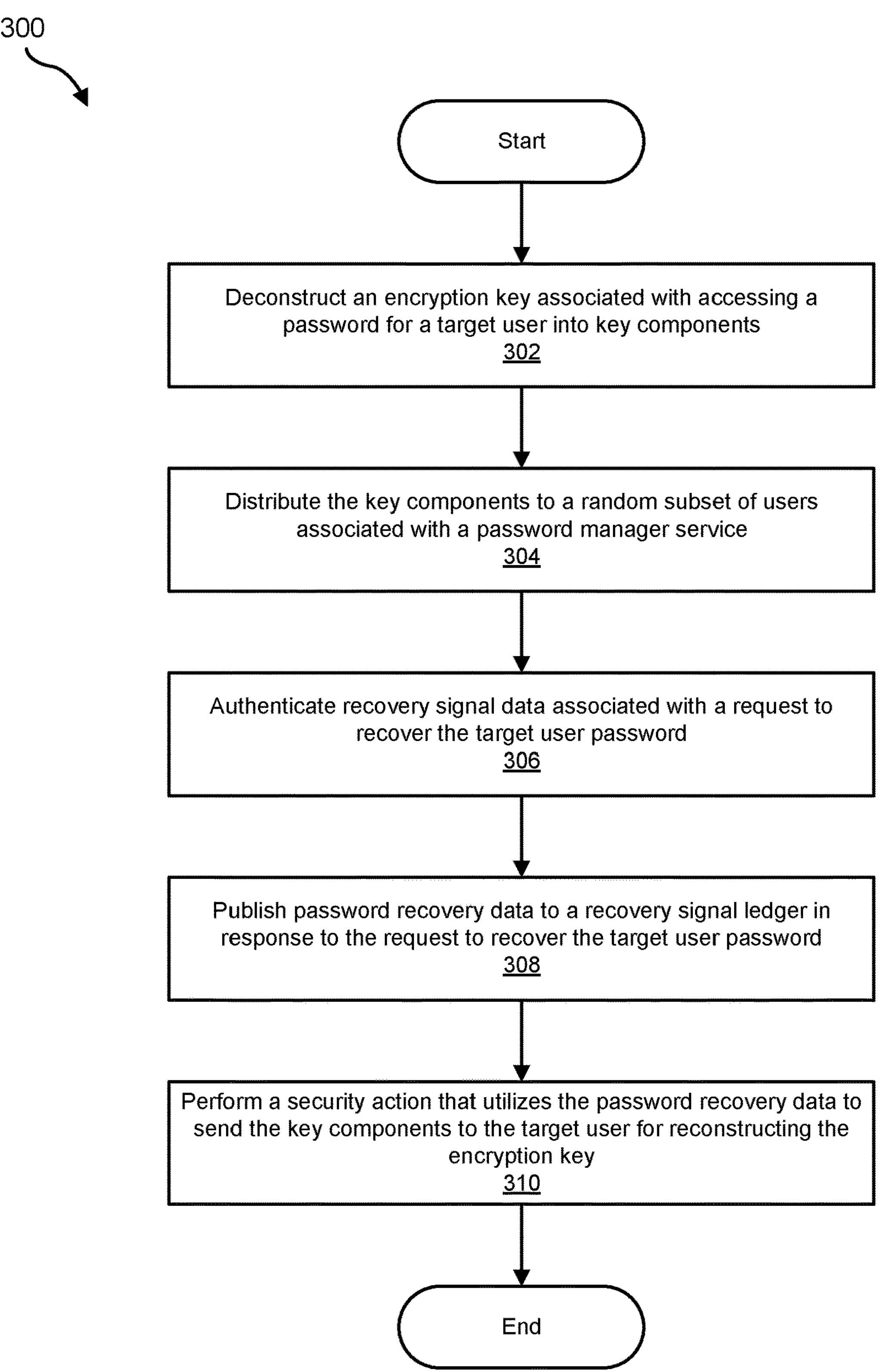
FIG. 3 is a flow diagram of an example method for password recovery within an untrusted environment.
Figure 4:
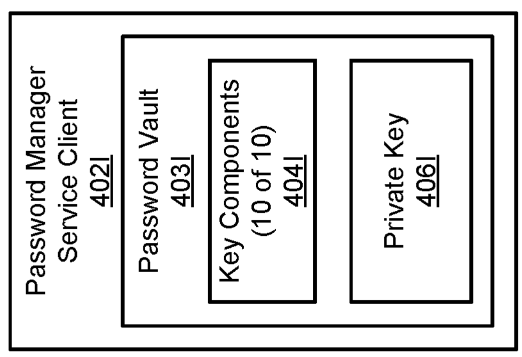
FIG. 4 is a block diagram of example password manager service clients that may be utilized in the example system of FIG. 2.
Figure 4:
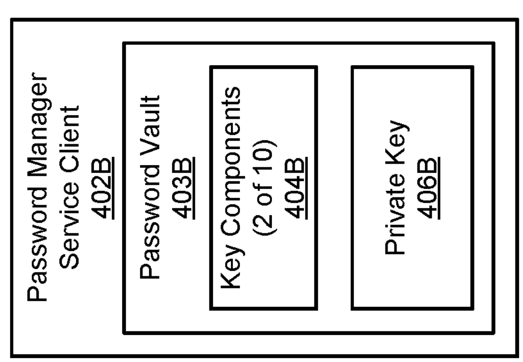
Figure 4:
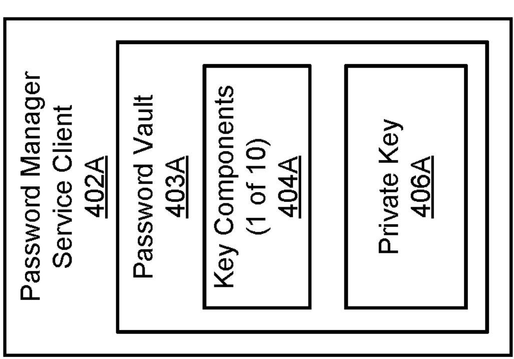

FIG. 3 is a flow diagram of an example computer-implemented method 300 for password recovery within an untrusted environment. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may deconstruct an encryption key associated with accessing a password for a target user into key components. For example, key module 104 may, as part of computing device 202 in FIG. 2, deconstruct encryption key 114 associated with accessing password 222 into key components 116.

Key module 104 may deconstruct encryption key 114 in a variety of ways. In some examples, key module 104 may split encryption key 114 into multiple portions (or chunks) within a numerical range derived from a secret sharing scheme. For example, upon the target user creating a password manager service account, key module 104 may split encryption key 114 into N chunks (K_1 . . . . K_N) according to Shamir's secret sharing (k of N scheme) where N is a large number (e.g., 500) and k is a smaller but also a non-trivial number (e.g., 10).

At step 304, one or more of the systems described herein may distribute the key components to a random subset of users associated with a password manager service. For example, distribution module 106 may, as part of computing device 202 in FIG. 2, distribute key components 116 to password manager service clients 210. As discussed above, in one example, password manager service clients 210 may represent a randomly selected subset of a total number of client devices, chosen by distribution module 106, associated with the password manager service.

Distribution module 106 may distribute key components 116 in a variety of ways. In some examples, distribution module 106 may encrypt key components 116 utilizing a public key 213 associated with each of password manager service clients 210 (i.e., the random subset of users). Then, distribution module 106 may save the encrypted key components 116 in a password manager service. Next, distribution module 106 may store each of encrypted key components 116 in a password vault associated with the each of password manager service clients 210. For example, and turning now to FIG. 4, a set of password manager service clients 402A, 402B, through 402I may each include a password vault 403A, 403B, through 403I storing portions of 10 key components (i.e., key components 404A, 404B, through 404I, respectively) and a private keys 406A, 406B, through 406I, respectively.

In some examples, distribution module 106 may utilize a encryption key associated with each of password manager service clients 210 and a user identification (e.g., a random unique identifier such as a UUIDv4 identifier) associated with the target user to protect encrypted key components 116 in the password vault. Additionally or alternatively, distribution module 106 may generate a group of distinct identifiers for each of password manager service clients 210 and then assign each of the distinct identifiers in the group to the each of encrypted key components 116 in the password vault.

At step 306, one or more of the systems described herein may authenticate recovery signal data associated with a request to recover the target user password. For example, authentication module 108 may, as part of computing device 202 in FIG. 2, authenticate recovery signal data 124 in response to receiving a recovery request from the target user.

Authentication module 108 may authenticate recovery signal data 124 in a variety of ways. In some examples, authentication module 108 may receive one or more recovery answers 216 to a set of security recovery questions associated with a password manager account for the target user password. Then, authentication module 108 may distribute a portion of each of recovery answers 216 to each of recovery servers 206. In some examples, authentication module 108 may distribute the portion of each of recovery answers 216 by geniting a hash of the portion of each of recovery answers 216 and then distribute the hash to each of recovery servers 206. Next, authentication module 108 may authenticate recovery answers 216 as recovery signal data 124.

Figure 5:
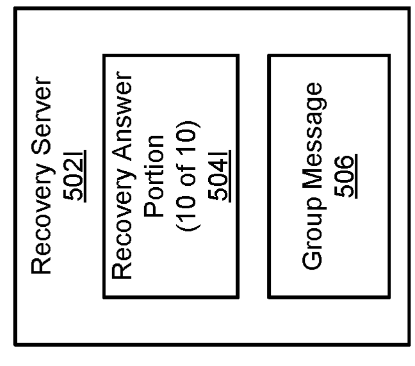
FIG. 5 is a block diagram of example recovery servers that may be utilized in the example system of FIG. 2.

In some examples, and turning now to FIG. 5, a group of recovery servers 502A, 502B, through 5021 may each include 10 portions of a recovery answer stored as recovery answer portions 504A, 504B, through 5041. Additionally, each of recovery servers 502A, 502B, through 502A may include a group message 506 (i.e., a group-signed message) which may be issued following a muti-round (e.g., a 2-round scheme) process to verify that recovery answer portions 504A, 504B, through 5041 correspond to one or more security recovery questions.

At step 308, one or more of the systems described herein may publish password recovery data to a recovery signal ledger in response to the request to recover the target user password. For example, recovery module 110 may, as part of computing device 202 in FIG. 2, publish password recovery data 128 to recovery signal ledger 126 in response to receiving the request to recover password 222. In some examples, password recovery data 128 may include group message 506 described above with respect to FIG. 5. In some examples, group message 506 may include a newly minted public key 214 for the target user, a target user ID, and a signed token. Additionally, the target user maintains private key 220 locally on target user client 208.

At step 310, one or more of the systems described herein may perform a security action that utilizes the password recovery data to send the key components to the target user for reconstructing the encryption key. For example, security module 112 may, as part of computing device 202 in FIG. 2, perform a security action that utilizes password recovery data 128 to send key components 116 to the target user for reconstructing encryption key 114.

Security module 112 may perform the security action in a variety of ways. In some examples, security module 112 may determine whether a threshold number of password manager service clients 210 have decrypted key components 116 and then, upon the threshold number having been reached, send the key components 116 to target user client 208 for reconstructing encryption key 114 associated with accessing password 222. In some examples, password manager service clients 210 may decrypt key components 116 by periodically monitoring recovery signal ledger 126 to find recovery requests approved by recovery servers 206, (ii) locally decrypt key components 116 utilizing private keys 224, (iii) encrypt key components 116 utilizing a public key 214 associated with target user client 208, and (iv) send the encrypted key components 116 to computing device 202. Computing device 202 may then send the encrypted key components 116 to target user client 208 for decryption using private key 220 and then reconstruct encryption key 114 for regaining access to the target user's password vault.

In some examples, the threshold number of password manager service clients 210 may represent a percentage of users of password manager service clients 210 (e.g., 20%) who are logged into the password management service when the recovery request is made by target user client 208. In some examples, security module 112 may be configured to detect network inactivity (e.g., an offline or terminated account status) associated with password manager service clients 210 and, if this number is below the aforementioned threshold, redistribute key components 116 to a new set of password manager service clients 210.

As explained above in connection with example method 300 in FIG. 3, the systems and methods herein may allow for users to independently recover lost/forgotten passwords, without relying on trusted third parties, by providing a password manager service that splits a target user's password encryption key (derived from a master password) into multiple portions or chunks among a set of unrelated/untrusted users of the password manager service. The encryption key may be split utilizing a k of N sharing scheme (e.g., Shamir's secret sharing) such that N is a large number and k is a smaller but non-trivial number. Each unrelated/untrusted user's portion of the encryption key may then be encrypted using their respective public key and saved in a protected storage (i.e., a key server outbox and each of the unrelated/untrusted user's vaults). The key server outbox prevents outside access from adversaries based on restricted access to the unrelated/untrusted users' private keys and the inability to reconstruct the encrypted chunks comprising the target user's password encryption key. Recovery of the target user's encryption key includes a group of recovery servers that may be utilized to authenticate or verify an out-of-band recovery request to a recovery signal ledger in a group-signed message. Utilizing a group of recovery servers decreases the likelihood of an adversary compromising all of the servers in the group. The unrelated/untrusted users may then periodically monitor the ledger for the verified message and locally decrypt their respective key chunks for sending them as encrypted data (e.g., using the target user's public key) to a password manager service for reconstruction of the target user's encryption key.

Figure 6:
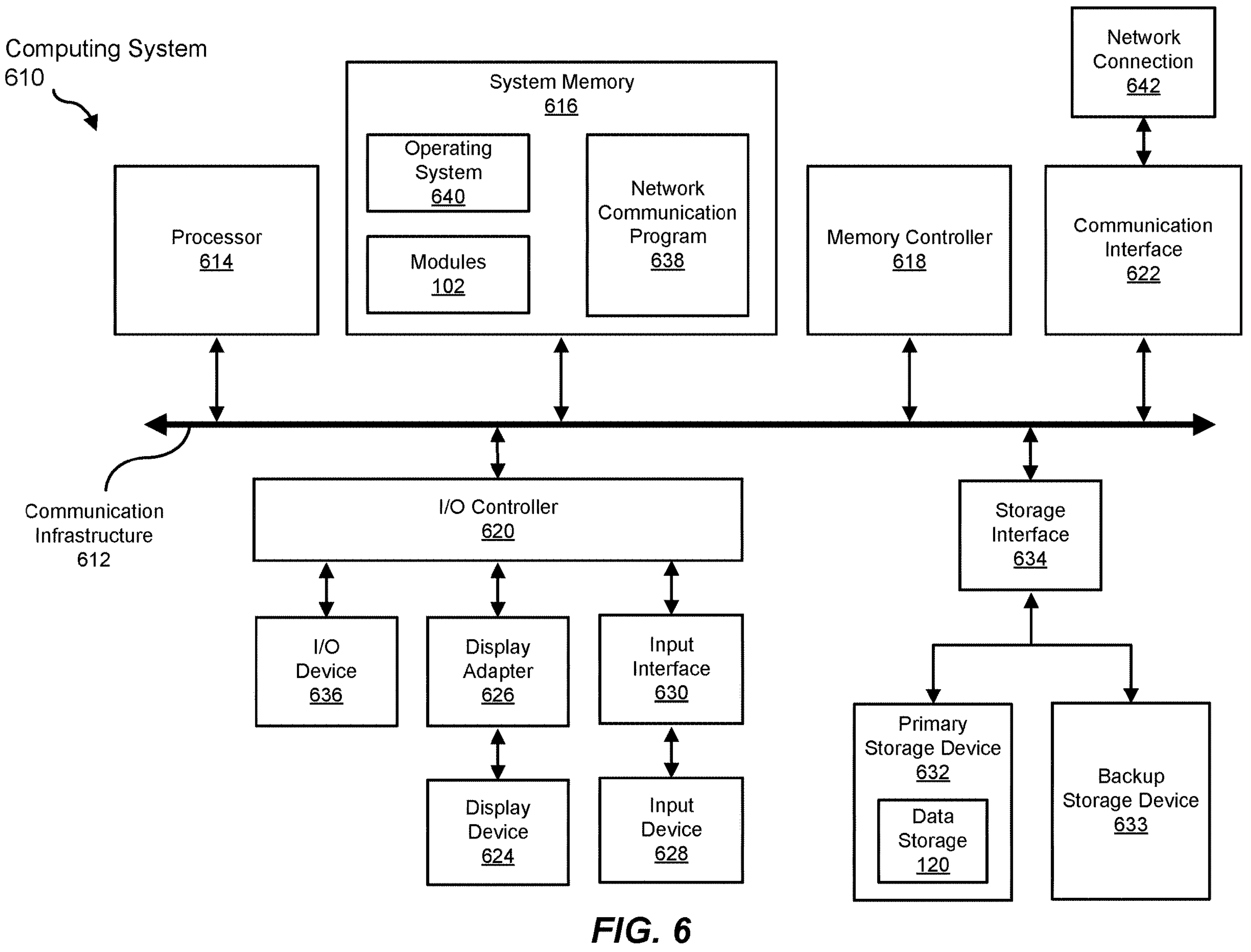
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
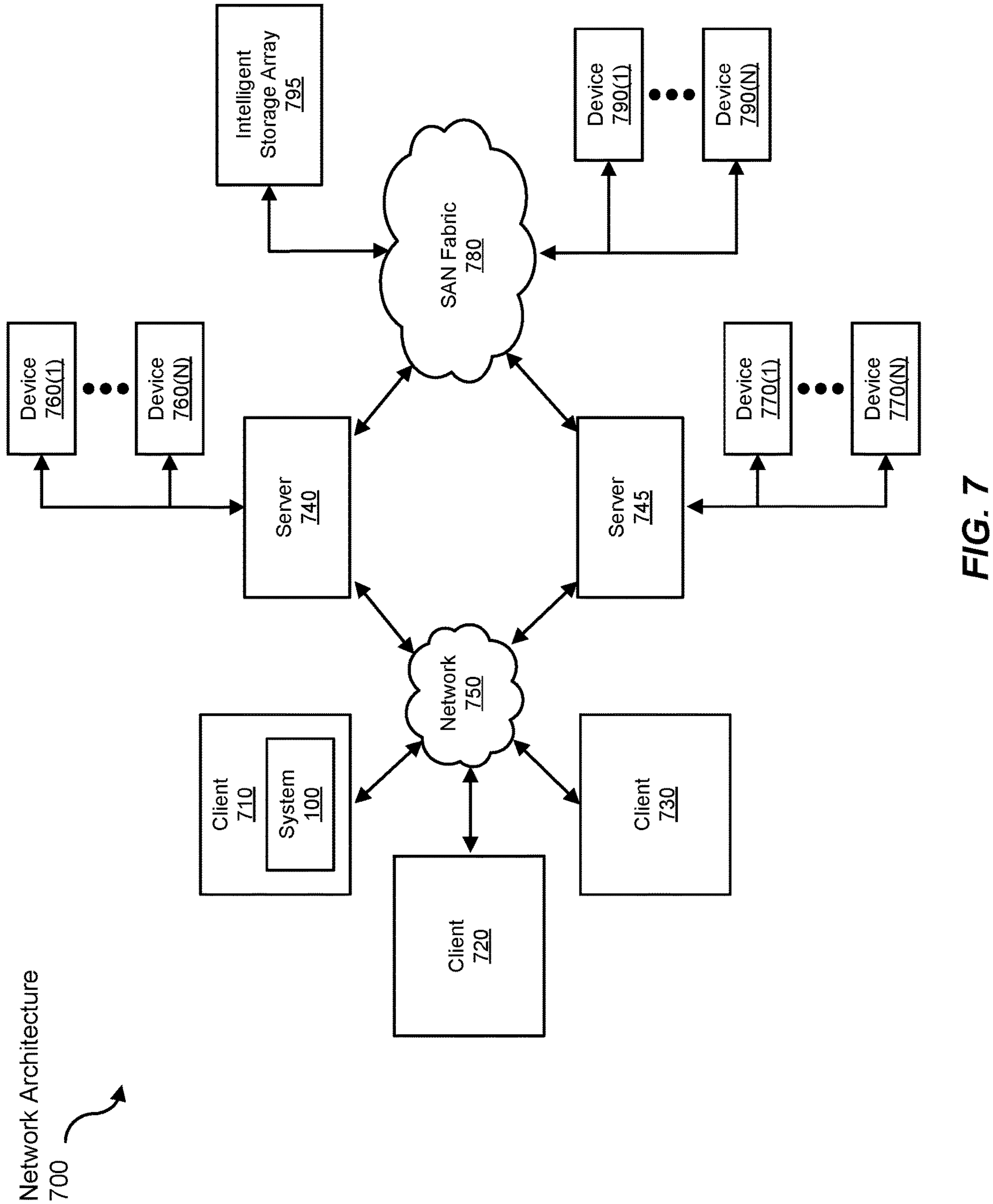
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for password recovery within an untrusted environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for password recovery within an untrusted environment, at least a portion of the method being performed by one or more computing devices comprising at least one processor, the method comprising:

deconstructing, by the one or more computing devices, an encryption key associated with accessing a password for a target user into a plurality of key components;

distributing, by the one or more computing devices, the key components to a plurality of password vaults corresponding to a random subset of users that the key components are associated with a password manager service and that the password manager service are unrelated to the target user;

authenticating, by the one or more computing devices, recovery signal data associated with a request to recover the target user password;

publishing, by the one or more computing devices and in response to the authenticating, password recovery data to a recovery signal ledger in response to the request to recover the target user password, wherein the recovery signal ledger corresponds to a distributed ledger configured for a consensus determination of an authenticated recovery request; and performing, by the one or more computing devices, a security action that utilizes the password recovery data in the recovery signal ledger to send the key components from the random subset of users to the target user for reconstructing the encryption key in response to the authenticated recovery request by performing the consensus determination.

2. The computer-implemented method of claim 1, wherein dividing the encryption key for the target user password into the key components comprises splitting the encryption key into a multiple portions within a numerical range derived from a secret sharing scheme.

3. The computer-implemented method of claim 1, wherein distributing the key components to the random subset of users associated with the password manager service comprises:

encrypting the key components utilizing a public key associated with each of the random subset of users;

saving the encrypted key components in the password manager service; and storing each of the encrypted key components in a password vault associated with the each of the random subset of users.

4. The computer-implemented method of claim 3, wherein storing the each of the encrypted key components in the password vault associated with the each of the random subset of users comprises utilizing an encryption key associated with the each of the random subset of users and a user identification associated with the target user to protect the each of the encrypted key components in the password vault.

5. The computer-implemented method of claim 3, wherein storing the each of the encrypted key components in the password vault associated with the each of the random subset of users comprises:

generating a plurality of distinct identifiers for the each of the random subset of users; and assigning each of the plurality of distinct identifiers to the each of the encrypted key components in the password vault.

6. The computer-implemented method of claim 1, wherein authenticating the recovery signal data associated with the request to recover the target user password, comprises:

receiving one or more answers to a set of security recovery questions associated with a password manager account for the target user password;

distributing a portion of each of the answers to each of a group of recovery servers; and authenticating the answers as the recovery signal data.

7. The computer-implemented method of claim 6, wherein distributing the portion of each of the answers to the each of the group of the recovery servers comprises:

generating a hash of the portion of each of the answers; and distributing the hash to the each of the group of recovery servers.

8. The computer-implemented method of claim 1, wherein performing the security action that utilizes the password recovery data in the recovery signal ledger to send the key components from the random subset of users to the target user for reconstructing the encryption key, comprises:

determining whether a threshold number of the random subset of users have decrypted the key components; and sending the key components associated with the threshold number of the random subset of users to the target user for reconstructing the encryption key.

9. The computer-implemented method of claim 1, further comprising:

detecting network inactivity among the random subset of users associated with the password service; and redistributing the key components to a new random subset of users associated with the password manager service.

10. The computer-implemented method of claim 9, wherein the network inactivity comprises one or more password manager account terminations associated with the random subset of users.

11. A system for password recovery within an untrusted environment, the system comprising:

at least one physical processor; and physical memory comprising computer-executable instructions and one or more modules that, when executed by the physical processor, cause the physical processor to:

deconstruct, by a key module, an encryption key associated with accessing a password for a target user into a plurality of key components;

distribute, by a distribution module, the key components to a plurality of password vaults corresponding to a random subset of users that the key components are associated with a password manager service and that the password manager service are unrelated to the target user;

authenticate, by an authentication module, recovery signal data associated with a request to recover the target user password;

publish, by a recovery module and in response to the authenticating, password recovery data to a recovery signal ledger in response to the request to recover the target user password, wherein the recovery signal ledger corresponds to a distributed ledger configured for a consensus determination of an authenticated recovery request; and perform, by a security module, a security action that utilizes the password recovery data in the recovery signal ledger to send the key components from the random subset of users to the target user for reconstructing the encryption key in response to the authenticated recovery request by performing the consensus determination.

12. The system of claim 11, wherein the key module deconstructs the encryption key for the target user password into the key components by splitting the encryption key into a multiple portions within a numerical range derived from a secret sharing scheme.

13. The system of claim 11, wherein the distribution module distributes the key components to the random subset of users associated with the password manager service by:

encrypting the key components utilizing a public key associated with each of the random subset of users;

saving the encrypted key components in the password manager service; and storing each of the encrypted key components in a password vault associated with the each of the random subset of users.

14. The system of claim 13, wherein the each of the encrypted key components are stored in the password vault associated with the each of the random subset of users by utilizing an encryption key associated with the each of the random subset of users and a user identification associated with the target user to protect the each of the encrypted key components in the password vault.

15. The system of claim 13, wherein the each of the encrypted key components are stored in the password vault associated with the each of the random subset of users by:

generating a plurality of distinct identifiers for the each of the random subset of users; and assigning each of the plurality of distinct identifiers to the each of the encrypted key components in the password vault.

16. The system of claim 11, wherein the authentication module authenticates the recovery signal data associated with the request to recover the target user password, by:

receiving one or more answers to a set of security recovery questions associated with a password manager account for the target user password;

distributing a portion of each of the answers to each of a group of recovery servers; and authenticating the answers as the recovery signal data.

17. The system of claim 16, wherein the portion of each of the answers to each of the group of recovery servers is distributed by:

generating a hash of the portion of each of the answers; and distributing the hash to the each of the group of recovery servers.

18. The system of claim 11, wherein the security module performs the security action that utilizes the password recovery data in the recovery signal ledger to send the key components from the random subset of users to the target user for reconstructing the encryption key, by:

determining whether a threshold number of the random subset of users have decrypted the key components; and sending the key components associated with the threshold number of the random subset of users to the target user for reconstructing the encryption key.

19. The system of claim 11, wherein the distribution module further distributes the key components to the random subset of users associated with the password manager service by:

detecting network inactivity among the random subset of users associated with the password service; and redistributing the key components to a new random subset of users associated with the password manager service.

20. A non-transitory computer-readable medium comprising one or more computer-executable instructions that, when executed by at least one processor of a computing device, cause the computing device to:

deconstruct an encryption key associated with accessing a password for a target user into a plurality of key components;

distribute the key components to a plurality of password vaults corresponding to a random subset of users that the key components are associated with a password manager service and that the password manager service are unrelated to the target user;

authenticate recovery signal data associated with a request to recover the target user password;

publish, in response to the authenticating, password recovery data to a recovery signal ledger in response to the request to recover the target user password, wherein the recovery signal ledger corresponds to a distributed ledger configured for a consensus determination of an authenticated recovery request; and perform a security action that utilizes the password recovery data in the recovery signal ledger to send the key components from the random subset of users to the target user for reconstructing the encryption key in response to the authenticated recovery request by performing the consensus determination.

* * * * *